United States Patent [19]

Gal

[11] Patent Number: 5,624,649
[45] Date of Patent: Apr. 29, 1997

[54] PROCESS FOR REDUCTION OF SULFUR DIOXIDE EMISSION FROM COMBUSTION GASES COMBINED WITH PRODUCTION OF POTASSIUM SULFATE

[75] Inventor: Eli Gal, Lititz, Pa.

[73] Assignee: General Electric Co., Schenectady, N.Y.

[21] Appl. No.: 430,940

[22] Filed: Apr. 26, 1995

[51] Int. Cl.$^6$ ............................................. C01D 5/02
[52] U.S. Cl. ........................ 423/243.11; 423/243.06; 423/199
[58] Field of Search ............... 423/243.06, 243.08, 423/243.11, 196, 199, 552

[56] References Cited

U.S. PATENT DOCUMENTS

| | | | |
|---|---|---|---|
| 2,233,841 | 3/1941 | Lepsae | 23/178 |
| 3,927,178 | 12/1975 | Jordan et al. | 423/242 |
| 4,554,151 | 11/1985 | Worthington et al. | 423/551 |
| 5,362,458 | 11/1994 | Saleem et al. | 423/243.06 |

OTHER PUBLICATIONS

Handbook of Chemistry & Physics, 1973, 54th Edition, p. B65.

*Primary Examiner*—David A. Simmons
*Assistant Examiner*—Linda L. Gray
*Attorney, Agent, or Firm*—Domenica N. S. Hartman; Robert C. Lampe, Jr.

[57] ABSTRACT

A wet flue gas desulfurization process and system are provided for removing sulfur dioxide from flue gases produced by processing operations of the type carried out in utility and industrial plants. In particular, the desulfurization process utilizes an ammonia-based solution having a free ammonia constituent that reacts with sulfur dioxide to generate an ammonium sulfate solution that can be further reacted to produce potassium sulfate, a valuable fertilizer. A second byproduct of this process is then reacted to regenerate free gaseous ammonia, which can then be recovered for subsequent use in the desulfurization of flue gases.

19 Claims, 2 Drawing Sheets

PROCESS FOR REDUCTION OF SULFUR DIOXIDE EMISSION FROM COMBUSTION GASES COMBINED WITH PRODUCTION OF POTASSIUM SULFATE

This invention generally relates to processes by which particulate matter and gases are removed from utility and industrial flue gases. More particularly, this invention is directed to a wet flue gas desulfurization process in which potassium sulfate is produced as a valuable byproduct from sulfur dioxide removed from flue gases using an ammonia-containing scrubbing solution.

BACKGROUND OF THE INVENTION

Gas-liquid contactors and absorbers are widely used to remove substances such as gases and particulate matter from combustion or flue gases produced by utility and industrial plants. Often of particular concern are sulfur dioxide ($SO_2$) and other acidic gases produced by the combustion of fossil fuels and various industrial operations. Such gases are known to be hazardous to the environment, and their emission into the atmosphere is closely regulated by clean air statutes. The method by which these gases are removed with a gas-liquid contactor or absorber is known as wet flue gas desulfurization.

The cleansing action produced by a gas-liquid contactor is generally derived from the passage of gas through a tower cocurrently or countercurrently to a descending liquid that cleans the gas. Wet flue gas desulfurization processes typically involve the use of calcium-based slurries or sodium-based or ammonia-based solutions. Examples of calcium-based slurries are limestone (calcium carbonate; $CaCO_3$) slurries and hydrated lime (calcium hydroxide; $Ca(OH)_2$) slurries formed by action of water on lime (calcium oxide; $CaO$). Such slurries react with the acidic gases to form precipitates that can be collected for disposal or recycling. Intimate contact between the alkaline slurry and acidic gases that are present in the flue gases, such as sulfur dioxide, hydrogen chloride (HCl) and hydrogen fluoride (HF), result in the absorption of the gases by the slurry and the formation of salts, such as calcium sulfite ($CaSO_3 \cdot \frac{1}{2}H_2O$), gypsum ($CaSO_4 \cdot 2H_2O$), calcium chloride ($CaCl_2$) and calcium fluoride ($CaF_2$). Forced oxidation of the slurry by aeration is often employed to ensure that all of the sulfites will be reacted to form sulfates, and thereby maximize the production of gypsum.

While gas-liquid contactors and absorbers utilizing calcium-based slurries as described above generally perform satisfactorily, their operation results in the production of large quantities of wastes or gypsum, the latter having only nominal commercial value. In contrast, ammonia-based scrubbing processes have been used in the art to produce a more valuable ammonium sulfate fertilizer. In these processes, sulfur dioxide from the flue gases reacts with ammonia to form an ammonium sulfate solution or ammonium sulfate crystals (($NH_4)_2SO_4$). A particular example of such a process is disclosed in U.S. Pat. No. 5,362,458, assigned to the assignee of the present invention, and results in the production of ammonium sulfate fertilizer. However, in many markets, the added value of ammonium sulfate over the value of ammonia is minimal. In addition, such prior art processes have required bulk supplies of ammonia that are consumed by the desulfurization process, necessitating the transportation and on-site storage of large quantities of ammonia. Because transportation and storage of ammonia are highly regulated and relatively costly, the production of ammonium sulfate using flue gas desulfurization systems is typically suitable for niche markets only.

From the above, it can be appreciated that prior art desulfurization processes generally have the disadvantage of producing, at best, a byproduct having only nominal market value, and therefore only a minor effect on the economic aspects of the desulfurization process. Accordingly, it would be desirable if a flue gas desulfurization process produced a product more valuable than the gypsum produced using calcium-based slurries, and was more economical than prior art methods employed in the production of ammonium sulfate fertilizer using ammonia-based solutions.

SUMMARY OF THE INVENTION

It is an object of this invention to provide a flue gas desulfurization process that utilizes an ammonia-based solution to remove sulfur dioxide from flue gases produced by utility and industrial facilities.

It is a further object of this invention that such a process be relatively uncomplicated and low cost, while capable of high yield production of a valuable byproduct.

It is another object of this invention that the process involve the consumption of materials that have a much lower relative value as compared to the process byproduct.

It is still a further object of this invention that the process recycle and regenerate the ammonia-based solution so as to minimize the amount of ammonia consumed by the process.

The present invention provides a wet flue gas desulfurization process for removing sulfur dioxide from flue gases produced by processing operations of the type carried out in utility and industrial plants. In particular, the process utilizes an ammonia-based solution having an ammonia constituent that reacts with sulfur dioxide to generate an ammonium sulfate solution, which can be further reacted to produce potassium sulfate, a valuable fertilizer. A secondary byproduct of this process is generated when ammonia is recovered in an ammonia regenerating step for subsequent use in the desulfurization of flue gases.

More particularly, the method of this invention generally entails the steps of delivering flue gases containing sulfur dioxide to a scrubber, and introducing a scrubbing solution containing ammonia into the scrubber such that the ammonia reacts with the sulfur dioxide to produce an ammonium sulfite solution. The ammonium sulfite solution is oxidized in situ to form ammonium sulfate solution. The ammonium sulfate solution is then diverted to a gas liquid contactor, where gaseous ammonia is absorbed into the solution. At least a portion of this ammonium sulfate solution is then diverted from the contactor to a vessel where the solution is reacted with potassium chloride to produce potassium sulfate, which precipitates from solution in the presence of the ammonia.

In accordance with this invention, free ammonia dissolved in the ammonium sulfate solution serves to drastically reduce the solubility of potassium sulfate, thereby promoting the precipitation of potassium sulfate crystals that can be readily recovered. As such, by dissolving an appropriate amount of ammonia in the ammonium sulfate solution, the process of this invention provides for a high yield production capability of potassium sulfate. Also notable is that the process is capable of generating a potassium sulfate product containing less than about 0.5 weight percent ammonium sulfate, while the remaining solution can contain less than about 0.1 weight percent potassium sulfate, which is indicative of a highly efficient production process.

Following its production, the potassium sulfate preferably undergoes a dewatering process so as to produce a dry potassium sulfate product, such that the remaining solution is mainly an ammonium chloride solution. The ammonium chloride solution can then be delivered to a recovery vessel, where a calcium hydroxide, such as lime or hydrated lime, is reacted with the solution to produce a calcium chloride solution and gaseous ammonia. The gaseous ammonia can then be recycled back to the process. In view of this last feature, ammonia losses in the process of this invention are very small, such that minimal supplemental ammonia is required to sustain the desulfurization operation. An additional advantage is that the process of this invention permits supplemental ammonia to be introduced into the absorber in the form of a low cost ammonium salt, such as ammonium sulfate.

From the above, it can be seen that the flue gas desulfurization process of this invention has the advantage of generating potassium sulfate, which has greater utility and economic value than gypsum produced by calcium-based processes. Furthermore, the potassium sulfate is produced by reacting relatively low cost consumables, such that the value of the potassium sulfate produced is significantly greater than the materials consumed by the process. This latter aspect is a notable advantage over prior art desulfurization processes. Furthermore, the present invention regenerates the ammonia required for desulfurization, such that the cost of ammonia, and the costs associated with handling and storing ammonia, do not negatively impact the economic practicality of the process.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

In accordance with this invention, an improved flue gas desulfurization process and system are provided, whereby sulfur dioxide gas entrained in flue gases is removed through the use of an ammonia-containing ammonium sulfate solution that is uniquely processed to both generate a useful and valuable byproduct while also enabling the regeneration of ammonia. While the invention will be described in reference to a desulfurization system that utilizes an absorber, those skilled in the art will recognize that the teachings of this invention can be readily applied to various other desulfurization systems, including gas-liquid contactors, scrubbing structures and various other equipment capable of enabling the processes described for this invention. Furthermore, the desulfurization process of this invention is compatible with various systems capable of removing other undesirable gases, mist, dust, fumes, smoke and/or particulate matter from a stream of gas.

Figure 1:
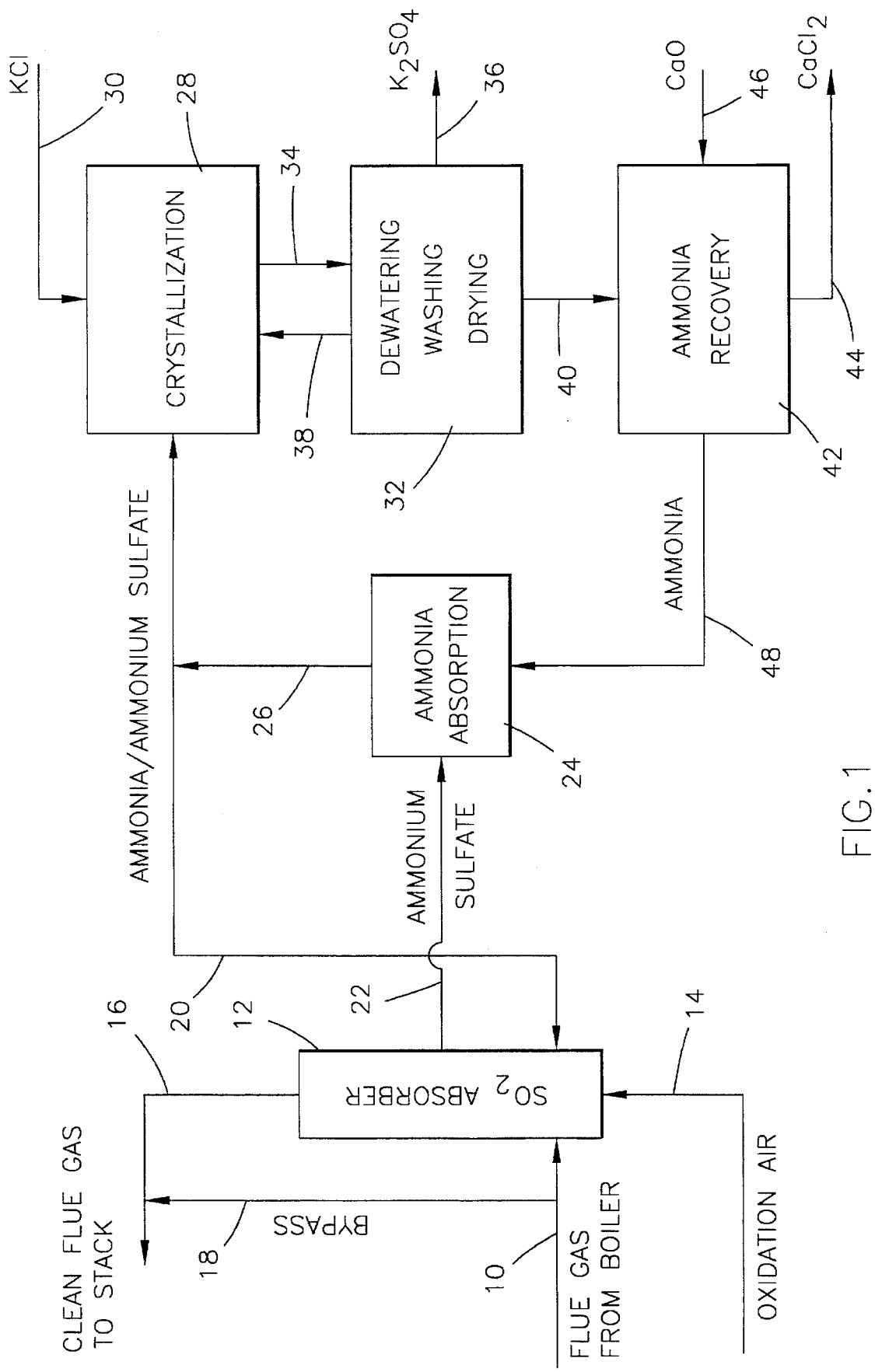
FIG. 1 is a schematic representation of a flue gas desulfurization system in accordance with a first embodiment of this invention.

FIG. 1 is a schematic view of a flue gas desulfurization system in accordance with a first embodiment of this invention. As shown in FIG. 1, an upright scrubber tower identified as a sulfur dioxide absorber 12 is supplied with flue gases by an inlet duct 10. The absorber 12 physically operates in a generally conventional manner for the purpose of removing sulfur dioxide from the flue gases, and afterwards delivers the scrubbed flue gases to a stack (not shown) or other suitable equipment through an outlet duct 16 located at its upper end. Though the flue gases are indicated as being delivered through the inlet duct 10 from a boiler (not shown), the source of the flue gases may be any process involving the combustion of fossil fuels or various industrial operations by which undesirable gases or particulate matter are produced. As is typical with desulfurization systems of the type illustrated, FIG. 1 shows a flue gas bypass 18 between the inlet duct 10 and the outlet duct 16, which allows bypassing of the flue gas desulfurization system. As will be apparent, the bypass 18 is not a necessary option for the desulfurization system of the present invention.

As with prior art desulfurization systems, a liquid is delivered to the absorber 12 for the purpose of contacting the flue gases to remove acidic gases from the flue gases. In accordance with this invention, the liquid is an ammoniacal scrubbing solution, and more particularly an aqueous ammonium sulfate solution containing free dissolved ammonia as the reagent for the desulfurization process. The ammonium sulfate solution serves as the liquid vehicle for delivering the ammonia to the absorber 12, a primary reactant in the production of potassium sulfate as the principal byproduct of the desulfurization process, and the sink for the regenerated ammonia. As shown in FIG. 1, the ammonium sulfate solution for the absorption process is provided to the absorber 12 through a pipe 20 or other suitable conduit.

The scrubbing process can involve spraying the ammonium sulfate solution into the absorber 12 so as to provide intimate contact between the solution and the flue gas. As a result, the solution absorbs sulfur dioxide and other acid gases, such as hydrogen chloride (HCl) and hydrogen fluoride (HF), if they are present in the flue gases. The ammonia-containing ammonium sulfate solution is used to control the pH in the absorber 12 within a typical range of about 4 to 6 pH range, such that the solution is highly reactive for high efficient capture of sulfur dioxide. The clean flue gas is then permitted to flow out of the absorber 12 through the outlet duct 16.

In addition to the above, a reaction occurs during the scrubbing operation between the free ammonia and sulfur dioxide that, after in situ forced oxidation, results in the production of additional ammonium sulfate. If hydrogen chloride and/or hydrogen fluoride are present in the flue gas, as is the case with flue gas produced by the combustion of coal, these acidic gases are also captured to form ammonium chloride and ammonium fluoride. A separate duct 14 is preferably employed to deliver air to the absorber 12, thereby promoting the conversion of sulfites to sulfates through in situ forced oxidation.

The ammonium sulfate solution generated in the absorber 12 can be maintained below saturation concentration, and typically in a range of about ten to about forty percent dissolved solids. This solution is then diverted through a pipe 22 to an ammonia absorption column 24 of a type known in the art. The column 24 utilizes one or more stages to absorb gaseous ammonia fed to the column 24 through a duct 48, the source of which will be explained in detail below. The absorption of the ammonia in the absorption column 24 is exothermic, such that a cooling system (not shown) is preferably employed to maintain the column 24 at a suitable temperature, preferably in the range of about 15° C. to about 50° C. The resulting product generated by the ammonia absorption column 24 contains free ammonia dissolved in ammonium sulfate solution, and exits the column 24 through a pipe 26. In accordance with this invention, a portion of the ammonia-containing ammonium sulfate solution is diverted back to the absorber 12 through the pipe 20, and used for further sulfur dioxide absorption. The balance of the solution is delivered to a crystallization vessel 28, where the production of potassium sulfate occurs.

Potassium sulfate is produced in the crystallization vessel 28 through a reaction between the ammonium sulfate solution and potassium chloride delivered to the vessel 28 through a separate feed 30. According to a particularly significant aspect of this invention, this reaction is facilitated by the presence of free ammonia in the ammonium sulfate solution generated within the column 24. In particular, the solubility of potassium sulfate is dramatically reduced in the presence of ammonia. Experimentation to simulate the conditions in the crystallization vessel 28 produced the following results.

Baseline

Ammonium sulfate solution was reacted with an equimolar amount of potassium chloride at about 20° C. and in the absence of free ammonia. The resulting washed potassium sulfate contained about 2.06% weight percent ammonium, while the resulting solution (mother liquor) contained about 4.85 weight percent dissolved sulfate. It was believed that the ammonium contained within the potassium sulfate most likely resulted from the co-precipitation of ammonium sulfate and potassium sulfate.

EXAMPLE 1

Under conditions identical to the above, but with fifteen percent by weight ammonia dissolved in the ammonium sulfate solution, the resulting washed potassium sulfate contained only about 0.4 weight percent ammonium, while the solution contained only about 0.025% sulfate. The above represented a reduction by a factor of about five in the concentration of ammonium in the potassium sulfate product, and a reduction by a factor of almost two hundred in the solubility of the potassium sulfate in the solution.

EXAMPLE 2

Under the same conditions as stated above, but with about thirty weight percent ammonia dissolved in the ammonium sulfate solution, the resulting washed potassium sulfate contained about 0.32% ammonium, while the wash solution contained only about 0.0125% sulfate.

From the above results, it is apparent that reactions conducted in the presence of free ammonia are capable of achieving a very high utilization of potassium sulfate. The reaction during the crystallization process generally yielded a slurry composed of potassium sulfate crystals and free dissolved ammonia in an ammonium chloride ($NH_4Cl$) solution. After filtering out the potassium sulfate, the remaining solution contained, in addition to a very low concentration of sulfate and dissolved free ammonia, the ammonium chloride as a secondary byproduct of the reaction. It is from this byproduct of the reaction that ammonia can be readily and advantageously recovered without the precipitation of large quantities of gypsum.

With reference again to FIG. 1, the slurry produced during crystallization is delivered through a pipe 34 to suitable dewatering equipment 32, such as hydroclones and filters. The resulting cake is washed and dried to produce a dry potassium sulfate product, which exits the dewatering equipment 32 through an outlet 36. A portion of the slurry is preferably returned to the crystallization vessel 28 through a conduit 38, while a purge solution produced by the dewatering operation is directed through a conduit 40 to an ammonia recovery vessel 42.

Figure 2:
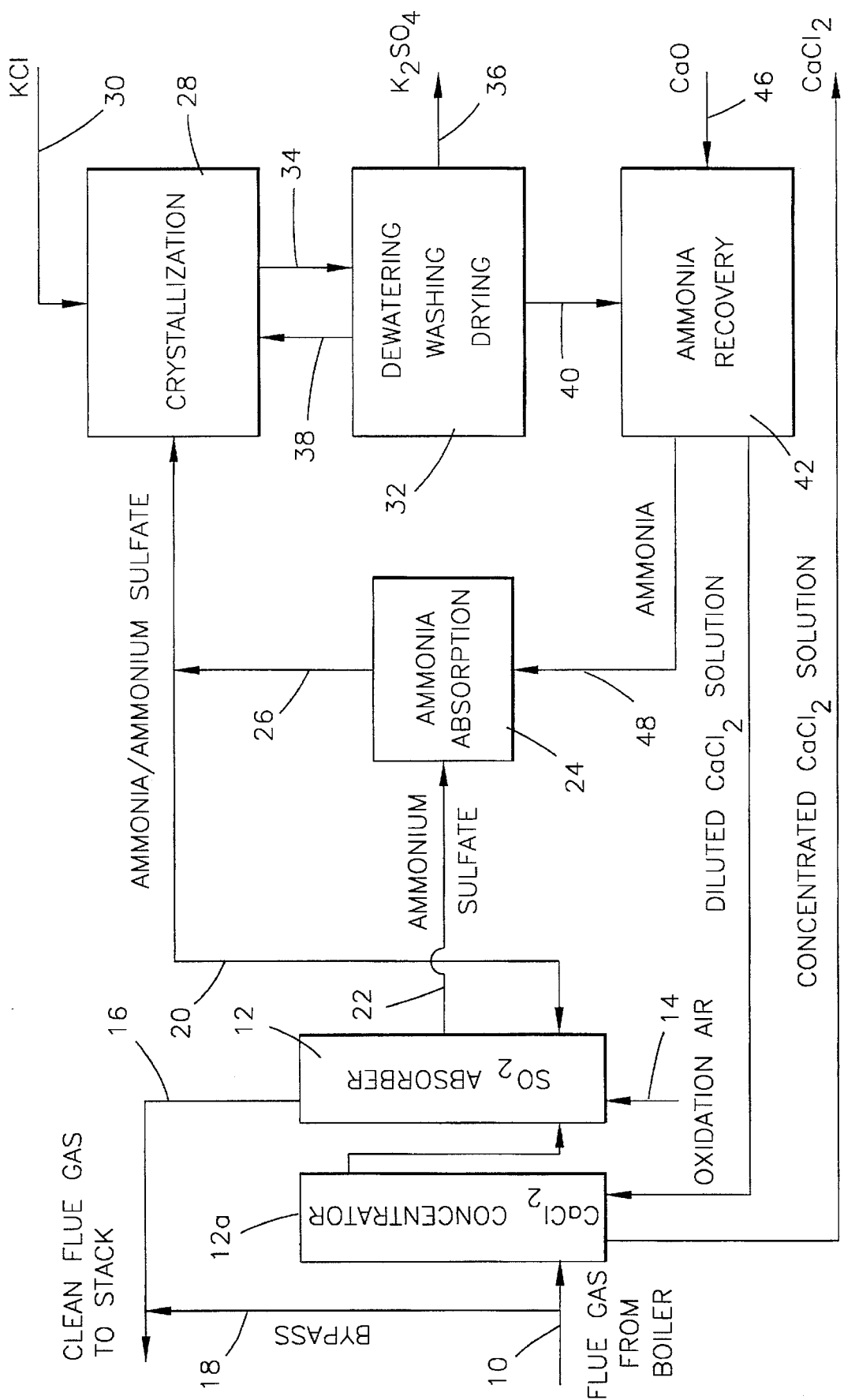
FIG. 2 is a schematic representation of a flue gas desulfurization system in accordance with a second embodiment of this invention, in which a flue gas prescrubber is employed as a calcium chloride solution concentrator.

In accordance with this invention, ammonia recovery can be achieved by reacting the ammonium chloride solution from the dewatering equipment 32 with lime or hydrated lime introduced into the ammonia recover vessel at 46. The lime increases the pH of the solution, thus converting the ammonium chloride to free ammonia and calcium chloride solution. The free ammonia can then be stripped from the solution with air or steam in a conventional manner (not shown), so as to yield a very low ammonia concentration in the calcium chloride solution. The free gaseous ammonia, in a mixture with steam or air, is directed to the ammonia absorption column 24 through the duct 48, while the remaining calcium chloride solution is removed from the recovery vessel 42 at 44. In a concentrated form, the calcium chloride can be sold for road deicing and dedusting. Alternatively, as illustrated in FIG. 2, a prescrubber 12a can be employed to remove hydrogen chloride, hydrogen fluoride, ash residues and heavy metals from the flue gas upstream of the absorber 12. Advantageously, the prescrubber 12a can also be employed to further concentrate the calcium chloride solution generated in the ammonia recovery process.

In view of the above, it can be seen that a significant advantage of the present invention is that a process is provided that decreases the cost of reducing sulfur dioxide emissions by efficiently utilizing the sulfur removed from flue gases to generate potassium sulfate, which has greater utility and economic value than gypsum produced by prior art calcium-based desulfurization processes. Advantageously, the present invention enables the production of potassium sulfate by reacting relatively low cost consumables, such as potassium chloride and lime, such that the value of the potassium sulfate produced is significantly greater than the materials consumed by the process.

Another significant advantage of this invention is that, while prior art desulfurization processes that use ammonia-based scrubbing solutions have required the consumption of ammonia to produce ammonium sulfate, the present invention regenerates ammonia such that the cost of ammonia, and the costs associated with handling and storing ammonia, do not negatively impact the economic practicality of the process. Ammonia losses for the process of the invention are very small, and are primarily attributable to minor amounts of residue in the potassium sulfate product. Either gaseous ammonia, aqueous ammonia or low cost ammonium salts, such as ammonium sulfate, can be used as a source for the lost ammonia. Furthermore, the ammonia required to compensate for this loss can be readily introduced into the system through the ammonia absorption column 24 or through the ammonia recovery vessel 42.

While the current invention has been described in terms of preferred embodiments, it is apparent that other forms could be adopted by one skilled in the art. For example, the novel features of this invention could be incorporated within flue gas desulfurization systems that differ from that represented in the Figures, slurry compositions could be employed that include constituents in addition to those disclosed, and other and/or additional equipment could be employed to further process the solutions and slurries used by the process, as well as process those compounds produced by the flue gas desulfurization system. Accordingly, the scope of the invention is to be limited only by the following claims.

What is claimed is:

1. A method for removing sulfur dioxide from flue gases, the method comprising the steps of:
   delivering flue gases containing sulfur dioxide to a first absorber;
   introducing a scrubbing solution containing ammonia into the first absorber, the ammonia reacting with the sulfur dioxide to yield a sulfite that is oxidized in situ to produce an ammonium sulfate solution;
   diverting at least a portion of the ammonium sulfate solution from the first absorber and absorbing gaseous ammonia therein; and
   diverting at least a portion of the ammonium sulfate solution containing the absorbed gaseous ammonia to a vessel where the ammonium sulfate solution is reacted with potassium chloride to produce potassium sulfate and an ammonium chloride solution, the gaseous ammonia absorbed in the ammonium sulfate solution serving to promote precipitation of the potassium sulfate.

2. A method as recited in claim 1 wherein air is introduced into the first absorber along with the scrubbing solution.

3. A method as recited in claim 1 further comprising the steps of:
   diverting at least a portion of the ammonium sulfate solution from the first absorber to a second absorber; and
   absorbing the gaseous ammonia into the ammonium sulfate solution in the second absorber prior to the step diverting the ammonium sulfate solution to the vessel;
   wherein a portion of the ammonium sulfate solution diverted to the second absorber is returned to the first absorber without first being introduced into the vessel.

4. A method as recited in claim 1 further comprising the steps of dewatering the potassium sulfate and producing a dry potassium sulfate product.

5. A method as recited in claim 1 wherein the ammonium chloride solution is delivered to a recovery vessel, wherein calcium hydroxide is reacted with the ammonium chloride solution to produce a calcium chloride solution and gaseous ammonia.

6. A method as recited in claim 5 further comprising the step of prescrubbing the flue gases prior to delivery to the first absorber.

7. A method as recited in claim 6 wherein the prescrubbing step includes delivering at least a portion of the calcium chloride solution to the prescrubber.

8. A method for removing sulfur dioxide from flue gases so as to produce potassium sulfate as a byproduct, the method comprising the steps of:
   delivering flue gases containing sulfur dioxide to a first absorber;
   introducing air and a scrubbing solution containing ammonia and an ammonium sulfate solution into the first absorber, the scrubbing solution removing sulfur dioxide from the flue gases by which the ammonia reacts with the sulfur dioxide to produce sulfites that are oxidized by the air introduced into the first absorber to produce additional ammonium sulfate solution;
   diverting the ammonium sulfate solution to a second absorber;
   absorbing gaseous ammonia into the ammonium sulfate solution in the second absorber so as to yield free ammonia dissolved in the ammonium sulfate solution;
   diverting a portion of the ammonium sulfate solution containing free ammonia from the second absorber to the first absorber for removal of sulfur dioxide from the flue gases; and
   delivering the remainder of the ammonium sulfate solution containing free ammonia from the second absorber to a vessel into where the ammonium sulfate solution is reacted with potassium chloride to produce potassium sulfate, a sufficient amount of free ammonia being dissolved in the ammonium sulfate solution so as to promote precipitation of the potassium sulfate.

9. A method as recited in claim 8 wherein the scrubbing solution introduced into the first scrubber consists essentially of aqueous ammonium sulfate solution and ammonia in the form of free ammonia.

10. A method as recited in claim 8 wherein the scrubbing solution maintains the flue gases in combination with the scrubbing solution in the first absorber at a pH of about 4 to about 6.

11. A method as recited in claim 8 wherein the flue gases contain hydrogen chloride and hydrogen fluoride, and wherein the scrubbing solution reacts with the hydrogen chloride and hydrogen fluoride within the first absorber to produce ammonium chloride and ammonium fluoride.

12. A method as recited in claim 8 wherein the ammonium sulfate solution diverted from the first absorber is characterized by a dissolved solid ammonium sulfate content of about ten to about forty percent.

13. A method as recited in claim 8 further comprising the steps of dewatering the potassium sulfate and producing a dry potassium sulfate product.

14. A method as recited in claim 13 wherein a byproduct of the dewatering step is an ammonium chloride solution.

15. A method as recited in claim 14 wherein, the potassium sulfate product contains less than about 0.5 weight percent ammonium and wherein the ammonium chloride solution contains less than about 0.1 weight percent sulfate.

16. A method as recited in claim 14 wherein the ammonium chloride solution is delivered to a recovery vessel, wherein a calcium-containing substance is reacted with the ammonium chloride solution to produce a calcium chloride solution and gaseous ammonia.

17. A method as recited in claim 16 wherein the flue gases further contain hydrogen chloride, hydrogen fluoride and particulate matter, the method further comprising the step of prescrubbing the flue gases so as to remove the hydrogen chloride, hydrogen fluoride and particulate matter from the flue gases prior to delivery to the first absorber.

18. A method as recited in claim 17 wherein the prescrubbing step includes delivering at least a portion of the calcium chloride solution to the prescrubber.

19. A method for removing gases and particulate matter in flue gases, the method comprising the steps of:
   contacting the flue gases with a scrubbing solution containing free gaseous ammonia and an aqueous ammonium sulfate solution while introducing the flue gases and air into a first absorber, the scrubbing solution removing sulfur dioxide from the flue gases through a reaction of the ammonia with the sulfur dioxide to produce sulfites that are oxidized by the air introduced into the first absorber to produce additional ammonium sulfate solution;
   diverting the ammonium sulfate solution to a second absorber;
   absorbing gaseous ammonia into the ammonium sulfate solution in the second absorber so as to yield free ammonia dissolved in the ammonium sulfate solution;
   diverting a portion of the ammonium sulfate solution containing free ammonia from the second absorber to the first absorber for removal of sulfur dioxide from the flue gases;

delivering the remainder of the ammonium sulfate solution containing free ammonia from the second absorber to a vessel into where the ammonium sulfate solution is reacted with potassium chloride to produce potassium sulfate that precipitates from solution in the presence of the free ammonia absorbed in the remainder of the ammonium sulfate solution;

dewatering the potassium sulfate so as to produce a dry potassium sulfate product and an ammonium chloride solution, the potassium sulfate product containing less than about 0.5 weight percent ammonium and the ammonium chloride solution containing less than about 0.1 weight percent potassium sulfate;

delivering the ammonium chloride solution is delivered to a recovery vessel, wherein a calcium-containing substance is reacted with the ammonium chloride solution to produce a calcium chloride solution and gaseous ammonia; and delivering the gaseous ammonia from the recovery vessel to the second absorber.

* * * * *